United States Patent
Natu

(10) Patent No.: US 8,944,690 B2
(45) Date of Patent: Feb. 3, 2015

(54) CORROSION RESISTANT BUSHING

(75) Inventor: Parag Natu, Neuss (DE)

(73) Assignee: Saint-Gobain Performance Plastics Pampus GmbH, Willich (DE)

( * ) Notice: Subject to any disclaimer, the term of this patent is extended or adjusted under 35 U.S.C. 154(b) by 1059 days.

(21) Appl. No.: 12/549,713

(22) Filed: Aug. 28, 2009

(65) Prior Publication Data

US 2011/0049834 A1    Mar. 3, 2011

(51) Int. Cl.
| | | |
|---|---|---|
| *F16C 33/12* | (2006.01) | |
| *F16C 33/24* | (2006.01) | |
| *F16C 33/20* | (2006.01) | |
| *F16C 11/04* | (2006.01) | |
| *F16C 17/24* | (2006.01) | |
| *F16C 35/02* | (2006.01) | |

(52) U.S. Cl.
CPC ............ *F16C 33/20* (2013.01); *F16C 33/203* (2013.01); *F16C 33/125* (2013.01); *F16C 11/04* (2013.01); *F16C 17/24* (2013.01); *F16C 35/02* (2013.01); *F16C 2300/42* (2013.01); *F16C 2326/20* (2013.01)
USPC ............... 384/276; 384/297; 384/625; 16/2.1

(58) Field of Classification Search
CPC ..... F16C 33/122; F16C 33/125; F16C 22/203
USPC ............. 384/26, 42, 129, 276, 278, 297, 384/624–625, 912, 913; 428/547, 553, 653, 428/673, 416; 29/898.053; 427/386; 524/432; 16/2.1
See application file for complete search history.

(56) References Cited

U.S. PATENT DOCUMENTS

| | | | | |
|---|---|---|---|---|
| 1,469,880 | A | | 10/1923 | Bowden |
| 2,386,951 | A | * | 10/1945 | Howe ............................ 384/278 |
| 2,865,692 | A | * | 12/1958 | Gossmann ..................... 384/298 |
| 3,061,386 | A | | 10/1962 | Dix et al. |
| 3,094,376 | A | * | 6/1963 | Thomas ......................... 384/297 |
| 3,142,887 | A | | 8/1964 | Hülck et al. |
| 3,438,660 | A | | 4/1969 | Steiner |

(Continued)

FOREIGN PATENT DOCUMENTS

| | | |
|---|---|---|
| BR | PI9201846 A | 1/1993 |
| CA | 2526653 | 12/2004 |

(Continued)

OTHER PUBLICATIONS

International Search Report from PCT Application No. PCT/US2012/030143, dated Oct. 31, 2012, 1 pg.

(Continued)

*Primary Examiner* — Marcus Charles
(74) *Attorney, Agent, or Firm* — Chi Suk Kim; Abel Law Group, LLP

(57) ABSTRACT

A method of forming a corrosion resistant bushing includes bonding a sliding layer to a first surface of a load bearing substrate to form a laminate sheet and cutting a blank from the laminate sheet. The laminate sheet includes an exposed surface corresponding to a second surface of the load bearing substrate. The blank includes cut edges having a load bearing substrate portion. The method further includes forming a semi-finished bushing from the blank, and applying a corrosion resistant coating to the exposed surface and the load bearing substrate portion of the cut edges to form the corrosion resistant bushing.

16 Claims, 7 Drawing Sheets

(56) References Cited

U.S. PATENT DOCUMENTS

| | | | |
|---|---|---|---|
| 3,633,398 A | 1/1972 | Koch | |
| 3,700,271 A | 10/1972 | Blaurock et al. | |
| 3,747,997 A | 7/1973 | Winn | |
| 3,838,928 A | 10/1974 | Blaurock et al. | |
| 4,072,368 A * | 2/1978 | Ehrentraut | 384/295 |
| 4,079,168 A * | 3/1978 | Schwemmer et al. | 428/416 |
| 4,083,622 A | 4/1978 | Neidecker | |
| 4,286,894 A | 9/1981 | Rongley | |
| 4,376,254 A | 3/1983 | Hellmann | |
| 4,790,683 A | 12/1988 | Cramer, Jr. et al. | |
| 4,800,623 A | 1/1989 | Brockhaus | |
| 4,828,423 A | 5/1989 | Cramer, Jr. et al. | |
| 4,889,772 A * | 12/1989 | Bergmann et al. | 384/912 |
| 4,916,026 A * | 4/1990 | Bergmann et al. | 384/624 |
| 4,932,795 A | 6/1990 | Guinn | |
| 4,981,390 A | 1/1991 | Cramer, Jr. et al. | |
| 5,003,212 A * | 3/1991 | Ibe et al. | 310/235 |
| 5,056,937 A * | 10/1991 | Tanaka et al. | 384/294 |
| 5,062,721 A | 11/1991 | Chiba | |
| 5,092,017 A | 3/1992 | Hatano et al. | |
| 5,193,917 A | 3/1993 | Adler et al. | |
| 5,305,654 A | 4/1994 | Durham | |
| 5,328,160 A | 7/1994 | McLaughlin | |
| 5,609,421 A | 3/1997 | Schulze-Eyssing et al. | |
| 5,633,086 A | 5/1997 | Hsu et al. | |
| 5,803,614 A * | 9/1998 | Tsuji et al. | 384/276 |
| 5,885,006 A | 3/1999 | Sheedy | |
| 5,906,029 A | 5/1999 | Fox | |
| 5,939,215 A * | 8/1999 | Andler | 428/653 |
| 5,964,474 A | 10/1999 | Chen | |
| 6,018,441 A | 1/2000 | Wu et al. | |
| 6,023,903 A * | 2/2000 | Stecker | 52/846 |
| 6,086,257 A * | 7/2000 | Lee | 384/129 |
| 6,114,040 A | 9/2000 | Gebregiorgis et al. | |
| 6,178,639 B1 * | 1/2001 | Lytwynec et al. | 384/294 |
| 6,186,027 B1 | 2/2001 | Nielsen | |
| 6,228,471 B1 * | 5/2001 | Neerinck et al. | 428/699 |
| 6,288,878 B1 | 9/2001 | Misso et al. | |
| 6,294,597 B1 * | 9/2001 | Rinde et al. | 523/442 |
| 6,318,898 B1 | 11/2001 | Ward et al. | |
| 6,321,712 B1 * | 11/2001 | Havel | 123/197.4 |
| 6,333,839 B1 | 12/2001 | Misso et al. | |
| 6,411,472 B1 | 6/2002 | Allsup | |
| 6,428,744 B1 * | 8/2002 | Takayama et al. | 419/2 |
| 6,480,363 B1 | 11/2002 | Prater | |
| 6,516,940 B1 | 2/2003 | Hart et al. | |
| 6,527,449 B1 | 3/2003 | Koyama et al. | |
| 6,572,270 B2 | 6/2003 | Takemura et al. | |
| 6,603,634 B1 | 8/2003 | Wood et al. | |
| 6,606,224 B2 | 8/2003 | Macpherson et al. | |
| 6,740,428 B2 * | 5/2004 | Norito et al. | 384/912 |
| 6,754,046 B2 | 6/2004 | Barina et al. | |
| 6,755,746 B2 | 6/2004 | Barnley et al. | |
| 6,792,650 B2 | 9/2004 | Stagg et al. | |
| 6,889,956 B2 | 5/2005 | Gutierrez et al. | |
| 6,905,779 B2 * | 6/2005 | Sakai et al. | 384/912 |
| 7,007,386 B1 | 3/2006 | Stover | |
| 7,118,808 B2 | 10/2006 | Woelki | |
| 7,367,107 B1 | 5/2008 | Fruge et al. | |
| 7,580,225 B2 | 8/2009 | Hanrahan et al. | |
| 7,742,676 B2 | 6/2010 | Tilliette et al. | |
| 7,922,418 B2 | 4/2011 | Baker et al. | |
| 7,957,103 B2 | 6/2011 | Woodhead et al. | |
| 7,958,637 B2 | 6/2011 | Hughes | |
| 8,033,733 B2 | 10/2011 | Lang | |
| 8,228,640 B2 | 7/2012 | Woodhead et al. | |
| 2002/0024770 A1 | 2/2002 | Hong et al. | |
| 2002/0039461 A1 | 4/2002 | Obara et al. | |
| 2002/0097937 A1 * | 7/2002 | Obara | 384/492 |
| 2002/0118490 A1 | 8/2002 | Macpherson et al. | |
| 2002/0123608 A1 | 9/2002 | Howard, III | |
| 2002/0172836 A1 * | 11/2002 | Takayama et al. | 384/912 |
| 2003/0150140 A1 * | 8/2003 | Takayama et al. | 37/458 |
| 2004/0057643 A1 | 3/2004 | Blanchard et al. | |
| 2004/0076356 A1 | 4/2004 | Kapaan et al. | |
| 2004/0157750 A1 * | 8/2004 | Danly et al. | 508/103 |
| 2004/0246627 A1 | 12/2004 | Durrum et al. | |
| 2005/0018936 A1 * | 1/2005 | Yoshimura et al. | 384/276 |
| 2005/0051975 A1 * | 3/2005 | Takayama et al. | 384/913 |
| 2005/0077101 A1 | 4/2005 | Yamamoto et al. | |
| 2005/0181216 A1 | 8/2005 | Nakanishi et al. | |
| 2005/0225903 A1 | 10/2005 | Sprankle et al. | |
| 2006/0165973 A1 | 7/2006 | Dumm et al. | |
| 2006/0177685 A1 | 8/2006 | Matsuda et al. | |
| 2006/0181811 A1 | 8/2006 | Hanrahan et al. | |
| 2006/0214341 A1 | 9/2006 | Sugiura et al. | |
| 2006/0228174 A1 | 10/2006 | Woodhead et al. | |
| 2006/0245675 A1 | 11/2006 | Lang | |
| 2006/0275076 A1 | 12/2006 | Hanrahan et al. | |
| 2006/0276246 A1 | 12/2006 | Needes et al. | |
| 2007/0000680 A1 | 1/2007 | Adachi et al. | |
| 2007/0291417 A1 | 12/2007 | Woodhead et al. | |
| 2008/0028591 A1 | 2/2008 | Hughes | |
| 2008/0043375 A1 | 2/2008 | Hanrahan et al. | |
| 2008/0160300 A1 * | 7/2008 | Hwang et al. | 428/345 |
| 2008/0199254 A1 | 8/2008 | Baker et al. | |
| 2008/0218008 A1 | 9/2008 | Ghasripoor et al. | |
| 2009/0068473 A1 * | 3/2009 | Van Wessel et al. | 428/416 |
| 2009/0238504 A1 * | 9/2009 | Suzuki et al. | 384/29 |
| 2010/0126823 A1 | 5/2010 | Gautier et al. | |
| 2010/0321832 A1 | 12/2010 | Woodhead et al. | |
| 2010/0321833 A1 | 12/2010 | Woodhead et al. | |
| 2011/0076096 A1 | 3/2011 | Slayne et al. | |
| 2011/0271512 A1 | 11/2011 | Hughes | |
| 2012/0240350 A1 | 9/2012 | Natu et al. | |

FOREIGN PATENT DOCUMENTS

| | | | | |
|---|---|---|---|---|
| CN | 1126286 A | 7/1996 | | |
| CN | 1402871 A | 3/2003 | | |
| CN | 1459007 A | 11/2003 | | |
| CN | 101122304 A | 2/2008 | | |
| DE | 1872950 | 5/1963 | | |
| DE | 50166 A1 | 10/1966 | | |
| DE | 3248148 | 7/1984 | | |
| DE | 4114643 A1 | 12/1995 | | |
| DE | 19915417 A1 | 10/1999 | | |
| DE | 10027513 A1 | 12/2001 | | |
| EP | 0507544 A1 | 10/1992 | | |
| EP | 0514329 A2 | 11/1992 | | |
| EP | 554144 A1 | 8/1993 | | |
| EP | 0514329 B1 | 9/1995 | | |
| EP | 1302684 A1 | 4/2003 | | |
| EP | 1305530 B1 | 3/2005 | | |
| EP | 1568437 A1 | 8/2005 | | |
| EP | 1754646 B1 | 2/2007 | | |
| EP | 1886895 A1 | 2/2008 | | |
| EP | 2009145 A1 | 12/2008 | | |
| GB | 195795 A | 4/1923 | | |
| GB | 414631 | 5/1933 | | |
| GB | 703563 | 2/1954 | | |
| GB | 866678 | 4/1961 | | |
| GB | 972589 A | 10/1964 | | |
| GB | 1376563 | 12/1974 | | |
| GB | 2382386 | 5/2003 | | |
| GB | 2402184 A * | 12/2004 | | F16C 33/20 |
| GB | 2459959 A | 11/2009 | | |
| JP | S48-021050 A | 3/1973 | | |
| JP | JP1981-049415 A | 5/1981 | | |
| JP | 59166711 | 9/1984 | | |
| JP | S6037416 A | 2/1985 | | |
| JP | 63076908 A | 4/1988 | | |
| JP | H02209585 A | 8/1990 | | |
| JP | 03048013 A * | 3/1991 | | F16C 29/02 |
| JP | 04-285317 A | 10/1992 | | |
| JP | 05052222 A * | 3/1993 | | F16C 33/24 |
| JP | 5052223 A | 3/1993 | | |
| JP | H05-098463 A | 4/1993 | | |
| JP | H0598463 A | 4/1993 | | |
| JP | 5126147 A | 5/1993 | | |
| JP | H05179277 A | 7/1993 | | |
| JP | H06249242 A | 9/1994 | | |
| JP | H0790533 A | 4/1995 | | |
| JP | 09-060397 A | 3/1997 | | |

(56) References Cited

FOREIGN PATENT DOCUMENTS

| | | | | |
|---|---|---|---|---|
| JP | 09508692 | | 9/1997 | |
| JP | 2000-120663 A | | 4/2000 | |
| JP | 2000188856 A | | 7/2000 | |
| JP | 2001208082 | | 8/2001 | |
| JP | 2001254732 A | | 9/2001 | |
| JP | 2001334892 A | | 12/2001 | |
| JP | 2002213453 | | 7/2002 | |
| JP | 2003183684 A | | 7/2003 | |
| JP | 2004-513309 A | | 4/2004 | |
| JP | 2004277565 A | | 10/2004 | |
| JP | 2004360855 A | * | 12/2004 | ............ F16C 33/20 |
| JP | 2007502370 | | 2/2007 | |
| JP | 2007186149 A | | 7/2007 | |
| JP | 2007239838 | | 9/2007 | |
| JP | 2007308988 A | | 11/2007 | |
| JP | 2008038990 A | | 2/2008 | |
| JP | 2008069923 A | | 3/2008 | |
| JP | 2008069924 A | | 3/2008 | |
| JP | 2008069925 A | | 3/2008 | |
| JP | 2008095178 A | | 4/2008 | |
| JP | 2008156690 A | | 7/2008 | |
| JP | 2008-531430 A | | 8/2008 | |
| JP | 2008184621 A | | 8/2008 | |
| JP | 2008281017 A | | 11/2008 | |
| JP | 2013503306 A | | 1/2013 | |
| RU | 2329415 C2 | | 7/2008 | |
| SU | 1646706 A2 | | 5/1991 | |
| WO | 0141136 A1 | | 6/2001 | |
| WO | 0159314 A1 | | 8/2001 | |
| WO | 03025907 | | 3/2003 | |
| WO | 2004094852 | | 11/2004 | |
| WO | 2004104268 A1 | | 12/2004 | |
| WO | 2006056731 | | 6/2006 | |
| WO | 2011023794 | | 3/2011 | |
| WO | 2011036126 | | 3/2011 | |

OTHER PUBLICATIONS

International Search Report and Written Opinion for PCT/EP2010/062544 dated Dec. 28, 2010, 12 pages.

A.R. Slayne; "Performance Characteristics of Acuator/Bearing Joints Made With Tolerance Rings"; Magnetic Recording Conference, 2002. Digest of Asia-Pacfific; ISBN: 0-7803-7509-2; pp. WE-P-14-01 to WE-P-14-02; Dec. 10, 2002.

European Search Report for European Patent Application No. 07252993.6 mailed Dec. 19, 2007, 7 pages.

European Search Report for European Patent Application No. 09013623.5 mailed Jan. 14, 2010, 5 pages.

International Search Report for PCT/GB2004/001681 mailed on Sep. 13, 2004, 3 pages.

International Search Report for PCT/GB2005/004067 mailed on Sep. 13, 20040, 2 pages.

International Search Report for PCT/EP2010/063828 mailed on Dec. 21, 2010, 3 pages.

U.S. Appl. No. 13/427,459 , filed Mar. 22, 2012, Inventors: Parag Natu et al.

U.S. Appl. No. 12/033,241, filed Feb. 19, 2008 Inventors: Marcus Baker et al.

U.S. Appl. No. 11/718,172 , filed May 31, 2007 Inventors: Niki S. Woodhead et al.

U.S. Appl. No. 12/884,383 , filed Sep. 17, 2010 Inventors: Andrew Robert Slayne et al.

U.S. Appl. No. 10/552,875, filed Oct. 13, 2005 Inventors: Niki S. Woodhead et al.

U.S. Appl. No. 12/870,978 , filed Aug. 30, 2010 Inventors: Niki S. Woodhead et al.

U.S. Appl. No. 12/870,984 , filed Aug. 30, 2010 Inventors: Niki S. Woodhead et al.

* cited by examiner

CORROSION RESISTANT BUSHING

FIELD OF THE DISCLOSURE

This disclosure, in general, relates to corrosion resistant bushings.

BACKGROUND

Sliding bearing composite materials consisting of a load bearing substrate and a sliding layer overlay are generally known. The load bearing substrate and the sliding layer are usually connected by laminating using a suitable adhesive. The sliding bearing composite materials can be used to form maintenance free bushing used, for example, by the automotive industry. These maintenance free bushings can be used for door, hood, and engine compartment hinges, seats, steering columns, flywheels, balancer shaft bearings, etc. Additionally, maintenance free bushings formed from the sliding bearing composite materials can also be used in non-automotive applications. There is an ongoing need for improved maintenance free bushings that have a longer maintenance free lifetime and improved corrosion resistance.

SUMMARY

In an embodiment, a method of forming a corrosion resistant bushing can include cutting a blank from a laminate sheet including a sliding layer bonded to a first surface of a load bearing substrate. The blank can have cut edges including a load bearing substrate portion and an exposed major surface of the load bearing substrate. The method can further include forming a semi-finished bushing from the blank, and applying a corrosion resistant coating to the exposed surface and the load bearing substrate portion of the cut edges to form the corrosion resistant bushing.

In another embodiment, a bushing can include a load bearing substrate. The load bearing substrate can have a first major surface, a second major surface, and edges. A sliding layer can be bonded to the first surface, and a corrosion resistant layer can be bonded to the second surface and can extend to cover the edges of the load bearing substrate.

In yet another embodiment, a bushing can include a load bearing substrate. The load bearing substrate can have a first major surface and a second major surface. A sliding layer can be bonded to the first surface, and a corrosion resistant layer can be bonded to the second surface. Further, the bushing can have a Corrosion Resistance Rating of at least about 120 hours.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
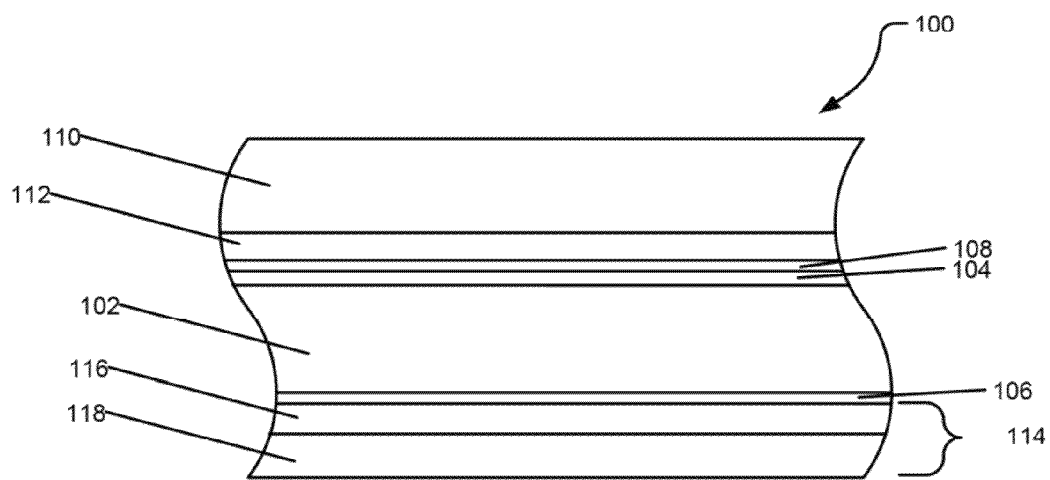
FIGS. 1 and 2 are illustrations of the layer structure of exemplary corrosion resistant bushings.

FIG. 1 shows a cross section illustrating the various layers of the corrosion resistant bushing, generally designated 100. Bushing 100 can include a load bearing substrate 102. The load bearing substrate 102 can be a metallic support layer. The metallic support layer can include a metal or metal alloy such as steel including carbon steel, spring steel, and the like, iron, aluminum, zinc, copper, magnesium, or any combination thereof. In a particular embodiment, the load bearing substrate 102 can be a metal (including metal alloys), such as ferrous alloys. The load bearing substrate 102 may be coated with temporary corrosion protection layers 104 and 106 to prevent corrosion of the load bearing substrate prior to processing. Additionally, temporary corrosion protection layer 108 can be applied over top of layer 104. Each of layers 104, 106, and 108 can have a thickness of between about 1 micron to about 50 microns, such as between about 7 microns and about 15 microns. Layers 104 and 106 can include a phosphate of zinc, iron, manganese, or any combination thereof. Additionally, the layers can be a nano-ceramic layer. Further, layers 104 and 106 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 108 can include functional silanes, nano-scaled silane based primers, hydrolysed silanes, organosilane adhesion promoters, solvent/water based silane primers. Temporary corrosion protection layers 104, 106, and 108 can be removed or retained during processing.

A sliding layer 110 can be applied to the load bearing substrate 102 with an adhesive layer 112. The sliding layer 110 can include a polymer. Examples of polymers that can be used in sliding layer 110 include polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxypolymer, polyacetal, polybutylene terephthalate, polyimide, polyetherimide, polyetheretherketone (PEEK), polyethylene, polysulfone, polyamide, polyphenylene oxide, polyphenylene sulfide (PPS), polyurethane, polyester, or any combination thereof. Additionally, sliding layer 110 can include fillers, such as a friction reducing filler. Examples of fillers that can be used in the sliding layer 110 include glass fibers, carbon fibers, silicon, graphite, PEEK, molybdenum disulfide, aromatic polyester, carbon particles, bronze, fluoropolymer, thermoplastic fillers, silicon carbide, aluminum oxide, polyamidimide (PAI), PPS, polyphenylene sulfone (PPSO2), liquid crystal polymers (LCP), aromatic polyesters (Econol), and mineral particles such as wollastonite and bariumsulfate, or any combination thereof. Fillers can be in the form of beads, fibers, powder, mesh, or any combination thereof.

Figure 2:
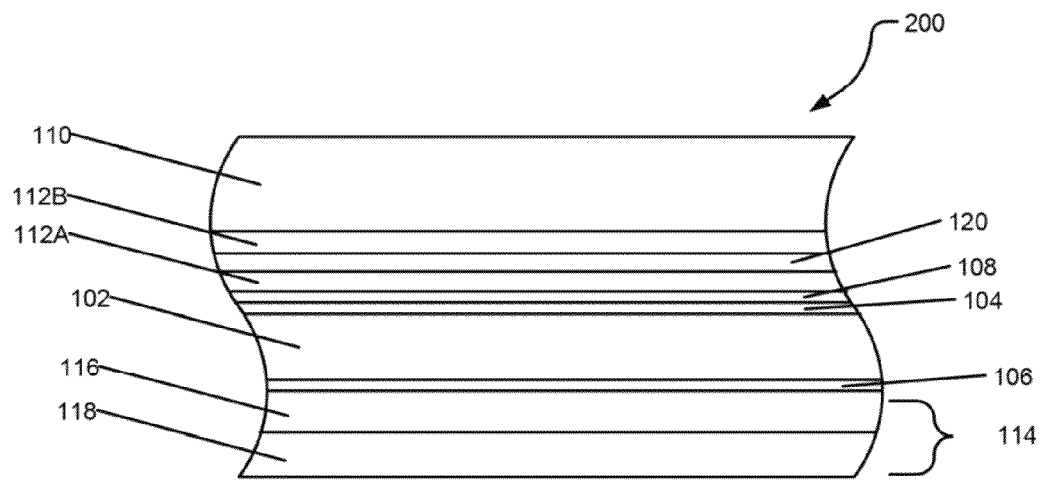

In an embodiment, the sliding layer may include a woven mesh or an expanded metal grid. The woven mesh or expanded metal grid can include a metal or metal alloy such as aluminum, steel, stainless steel, bronze, or the like. Alternatively, the woven mesh can be a woven polymer mesh. In an alternate embodiment, the sliding layer may not include a mesh or grid. In another alternate embodiment shown in FIG. 2, the woven mesh or expanded metal grid 120 may be embedded between two adhesive layers 112A and 112B.

Returning to FIG. 1, adhesive layer 112 can be a hot melt adhesive. Examples of adhesive that can be used in adhesive layer 112 include fluoropolymers, an epoxy resins, a polyimide resins, a polyether/polyamide copolymers, ethylene vinyl acetates, Ethylene tetrafluoroethylene (ETFE), ETFE copolymer, perfluoroalkoxy (PFA), or any combination thereof. Additionally, the adhesive layer 112 can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive layer 112 can include a copolymer. In an embodiment, the hot melt adhesive can have a melting temperature of not greater than about 250° C., such as not greater than about 220° C. In another embodiment, the adhesive layer 112 may break down above about 200° C., such as above about 220° C. In further embodiments, the melting temperature of the hot melt adhesive can be higher than 250° C., even higher than 300° C.

On an opposing surface of the load bearing substrate 102 from sliding layer 110, a corrosion resistant coating 114 can be applied. The corrosion resistant coating 114 can have a thickness of between about 1 micron and about 50 microns, such as between about microns and about 20 microns, such as between about 7 microns and 15 microns. The corrosion resistant coating can include an adhesion promoter layer 116 and an epoxy layer 118. The adhesion promoter layer 116 can include a phosphate of zinc, iron, manganese, tin, or any combination thereof. Additionally, the adhesion promoter layer 116 can be nano-ceramic layer. The adhesion promoter layer 116 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof.

The epoxy layer 118 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin can include synthetic resin modified epoxies based on phenolic resins, urea resins, melamine resins, benzoguanamine with formaldehyde, or any combination thereof. By way of example, epoxies can include

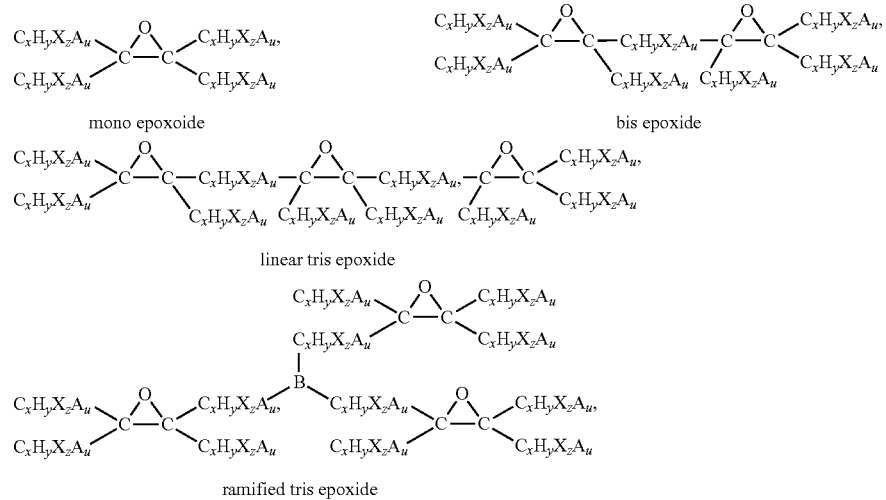

or any combination thereof, wherein $C_xH_yX_zA_U$ is a linear or ramified saturated or unsaturated carbon chain with optionally halogen atoms $X_Z$ substituting hydrogen atoms, and optionally where atoms like nitrogen, phosphorous, boron, etc, are present and B is one of carbon, nitrogen, oxygen, phosphorous, boron, sulfur, etc.

The epoxy resin can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_xH_yX_zA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula $R_1R_2R_3N$ where R can be $C_xH_yX_zA_U$ as described above.

In an embodiment, the epoxy layer 118 can include fillers to improve the conductivity, such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof. The conductive fillers can allow current to pass through the epoxy coating and can increase the conductivity of the coated bushing as compared to a coated bushing without conductive fillers.

In an embodiment, an epoxy layer can increase the corrosion resistance of the bushing. For example, an epoxy layer, such as epoxy layer 118, can substantially prevent corrosive elements, such as water, salts, and the like, from contacting the load bearing substrate, thereby inhibiting chemical corrosion of the load bearing substrate. Additionally, the epoxy layer can inhibit galvanic corrosion of either the housing or the load bearing substrate by preventing contact between dissimilar metals. For example, placing an aluminum bushing without the epoxy layer within a magnesium housing can cause the magnesium to oxidize. However, an epoxy layer, such as epoxy layer 118, can prevent the aluminum substrate from contacting the magnesium housing and inhibit corrosion due to a galvanic reaction.

Turning to the method of forming the bushing, the sliding layer can be glued to the load bearing substrate using a melt adhesive to form a laminate sheet. The laminate sheet can be cut into strips or blanks that can be formed into the bushing. Cutting the laminate sheet can create cut edges including an exposed portion of the load bearing substrate. The blanks can be formed into the bushing, such as by rolling and flanging the laminate to form a semi-finished bushing of a desired shape.

Figure 3:
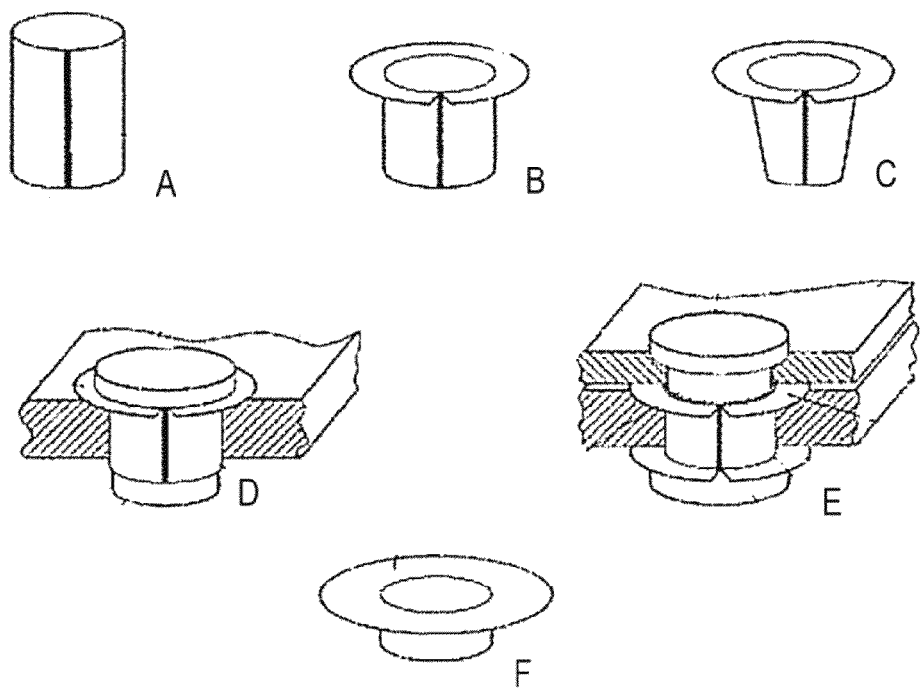
FIG. 3 is an illustration of various embodiment of bushing.

FIGS. 3A through 3F illustrates a number of bushing shapes that can be formed from the blanks FIG. 3A illustrates a cylindrical bushing that can be formed by rolling. FIG. 3B illustrates a flanged bushing that can be formed by rolling and flanging. FIG. 3C illustrates a flanged bushing having a tapered cylindrical portion that can be formed by rolling a tapered portion and flanging an end. FIG. 3D illustrates a flanged bushing mounted in a housing with a shaft pin mounted through the flanged bushing. FIG. 3E illustrates a two-sided flanged bushing mounted in a housing with a shaft pin mounted through the two-sided flanged bushing. FIG. 3F illustrates an L type bushing that can be formed using a stamping and cold deep drawing process, rather than rolling and flanging.

After shaping the semi-finished bushing, the semi-finished bushing may be cleaned to remove any lubricants and oils used in the forming and shaping process. Additionally, cleaning can prepare the exposed surface of the load bearing substrate for the application of the corrosion resistant coating. Cleaning may include chemical cleaning with solvents and/or mechanical cleaning, such as ultrasonic cleaning.

In an embodiment, an adhesion promoter layer, such as adhesion promoter layer 116, can be applied to the exposed surfaces of the load bearing substrate. The adhesion promoter layer can include a phosphate of zinc, iron, manganese, tin, or any combination thereof. The adhesion promoter layer may be applied as a nano-ceramic layer. The adhesion promoter layer 116 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The adhesion promoter layer can be applied by spray coating, e-coating, dip spin coating, electrostatic coating, flow coating, roll coating, knife coating, coil coating, or the like.

Further, application of the corrosion resistant layer can include applying an epoxy coating. The epoxy can be a two-component epoxy or a single component epoxy. Advantageously, a single component epoxy can have a longer working life. The working life can be the amount of time from preparing the epoxy until the epoxy can no longer be applied as a coating. For example, a single component epoxy can have a working life of months compared to a working life of a two-component epoxy of a few hours.

In an embodiment, the epoxy layer can be applied by spray coating, e-coating, dip spin coating, electrostatic coating, flow coating, roll coating, knife coating, coil coating, or the like. Additionally, the epoxy layer can be cured, such as by thermal curing, UV curing, IR curing, electron beam curing, irradiation curing, or any combination thereof. Preferably, the curing can be accomplished without increasing the temperature of the component above the breakdown temperature of any of the sliding layer, the adhesive layer, the woven mesh, or the adhesion promoter layer. Accordingly, the epoxy may be cured below about 250° C., even below about 200° C.

Preferably, the corrosion resistant coating, and particularly the epoxy layer, can be applied to cover the exposed edges of the load bearing substrate as well as the major surface not covered by the sliding layer. E-coating and electrostatic coating can be particularly useful in applying the corrosion resistant coating layers to all exposed metallic surfaces without coating the non-conducting sliding layer. Further, it is preferable for the corrosion resistant coating to continuously cover the exposed surfaces of the load bearing substrate without cracks or voids. The continuous, conformal covering of the load bearing substrate can substantially prevent corrosive elements such as salts and water from contacting the load bearing substrate. In an embodiment, the bearing with such a corrosion resistant coating can have a significantly increased lifetime, and in particular, the bearing can have a Corrosion Resistance Rating of at least about 120 hours, such as at least about 168 hours, such as at least about 240 hours, even at least about 288 hours.

Figure 4:
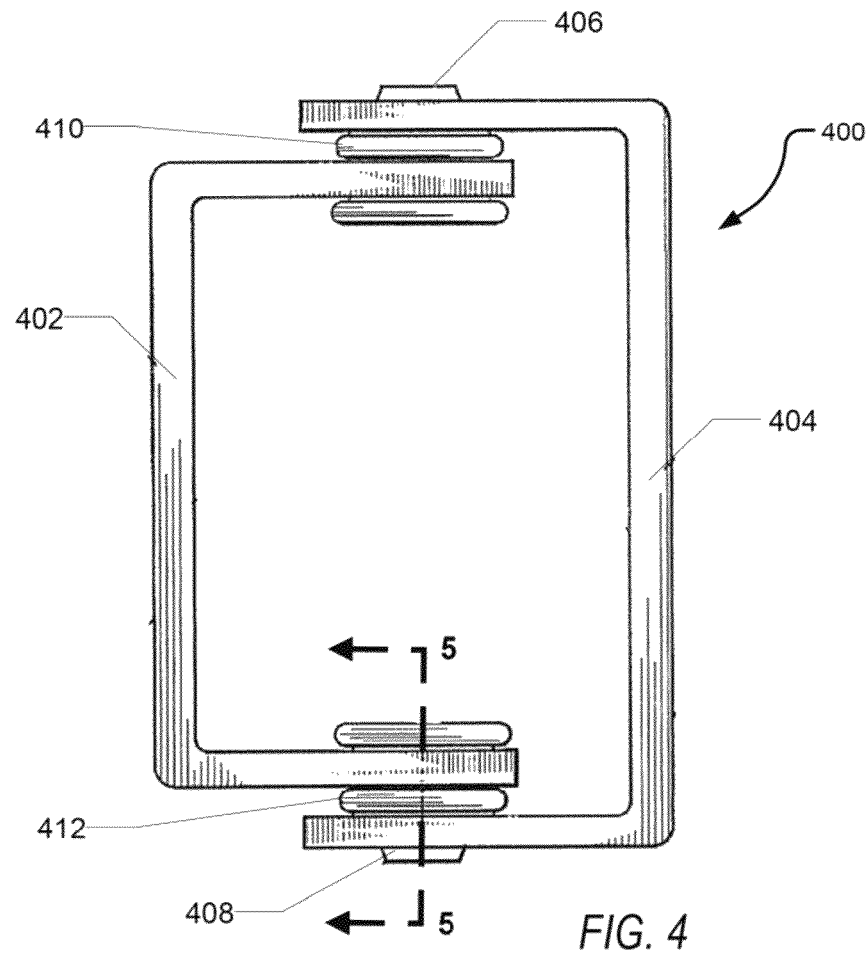
FIGS. 4, 5, and 6 are illustrations of exemplary hinges.
Figure 5:
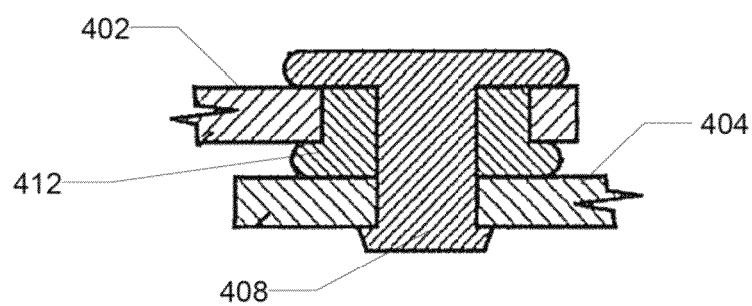

In an alternate embodiment, the corrosion resistance layer can be applied at any point during the processing of the bushing, including before applying the sliding layer, prior to forming the blank but after applying the sliding layer, or between forming the blank and shaping the bushing. FIGS. 4 and 5 illustrate an exemplary hinge 400, such as an automotive door hinge, hood hinge, engine compartment hinge, and the like. Hinge 400 can include an inner hinge portion 402 and an outer hinge portion 404. Hinge portions 402 and 404 can be joined by rivets 406 and 408 and bushings 410 and 412. Bushings 410 and 412 can be corrosion resistant bushings, as previously described. FIG. 5 illustrates a cross section of hinge 400, showing rivet 408 and bushing 412 in more detail.

Figure 6:
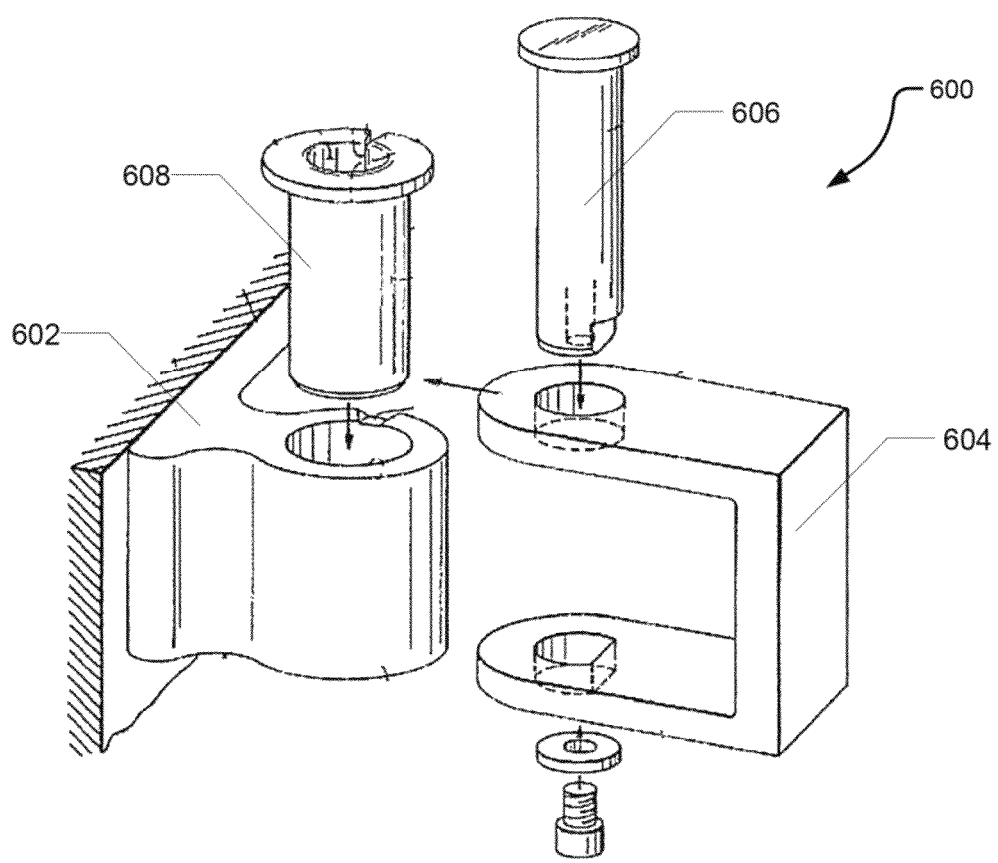

FIG. 6 illustrates another exemplary hinge 600, such as an automotive door hinge, hood hinge, engine compartment hinge, and the like. Hinge 600 can include a first hinge portion 602 and a second hinge portion 604 joined by a pin 606 and a bushing 608. Bushing 608 can be a corrosion resistant bushing as previously described.

Figure 7:
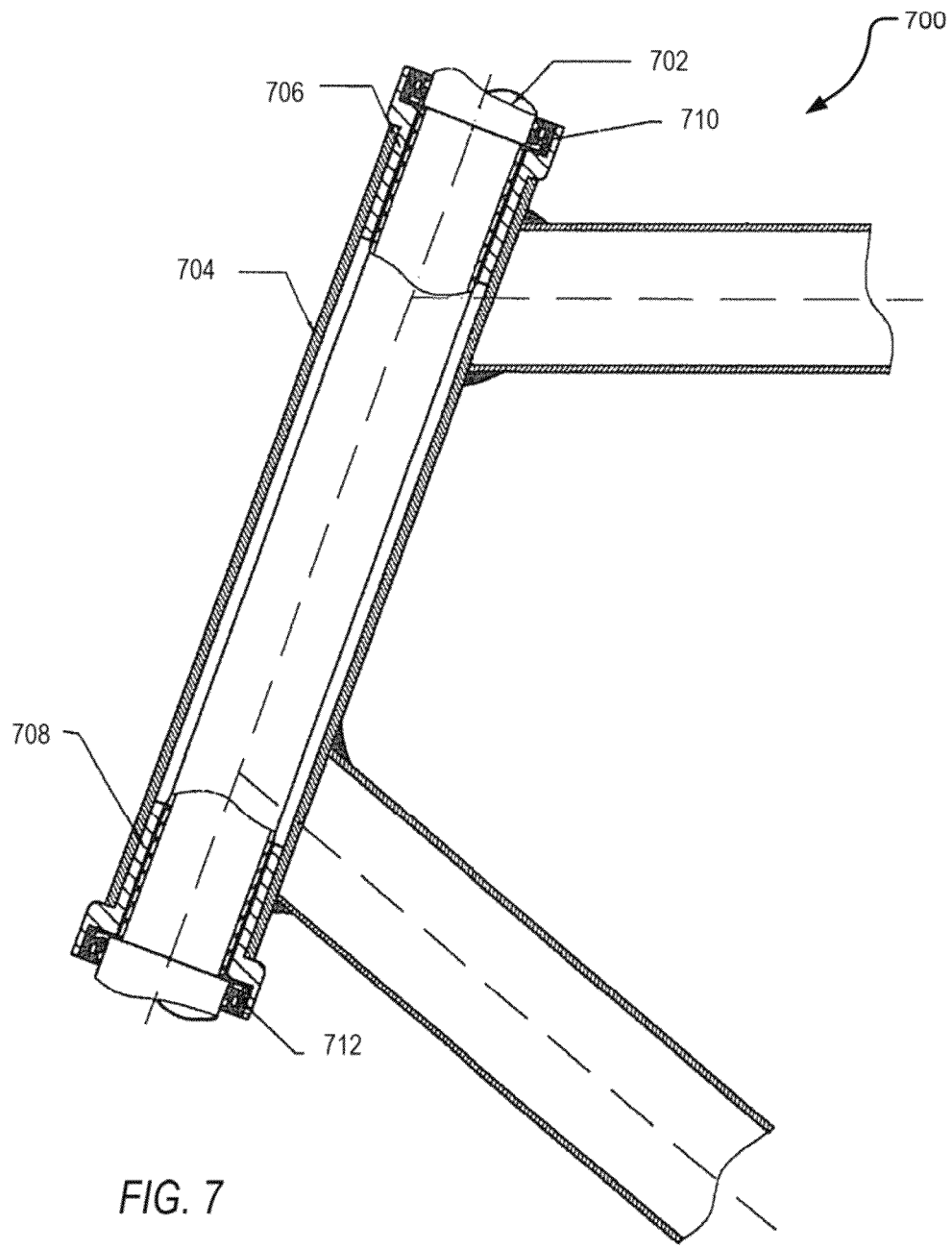
FIG. 7 is an illustration of an exemplary bicycle headset.

FIG. 7 illustrates an exemplary headset 700 for a two-wheeled vehicle, such as a bicycle. A steering tube 702 can be inserted through a head tube 704. Bushings 706 and 708 can be placed between the steering tube 702 and the head tube 704 to maintain alignment and prevent contact between the steering tube 702 and the head tube 704. Additionally, seals 710 and 712 can prevent contamination of the sliding surface of the bushing by dirt and other particulate matter.

EXAMPLES

A Corrosion Resistance Rating is determined according to the neutral salt spray test defined by ISO 9227:2006 "Corrosion tests in artificial atmospheres—salt spray tests", Second Edition published Jul. 15, 2007. Generally, a test bushing is placed in a salt spray chamber and subjected to a spray of salt until at least 10% of the surface is covered by iron rust.

For example Comparative Sample 1 is prepared by cutting a blank from an 'M' type laminate (M100GG-2022-B commercially available from Saint-Gobain Performance Plastics) and shaping to form the semi-finished bushing. The blank is shaped by rolling and flanging to obtain the desired shape. The semi-finished product is galvanized with a layer of zinc. Passivation chemicals are applied to the zinc layer, and then a sealing layer is applied overtop the passivated zinc layer. The Corrosion Resistance Rating of Comparative Sample 1 is determined to be 96 hours.

Figure 8:
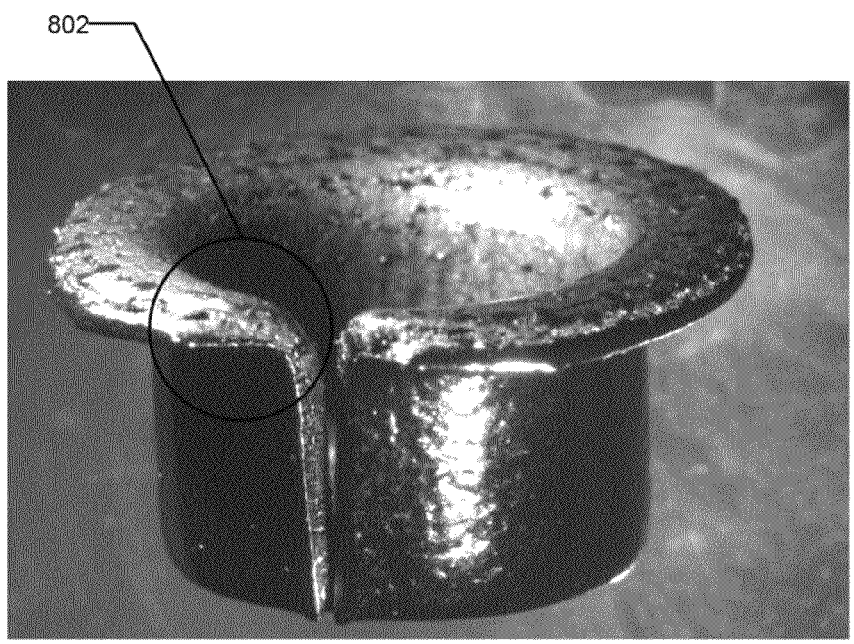
FIG. 8 is a view of the corrosion resistant bushing.
Figure 9:
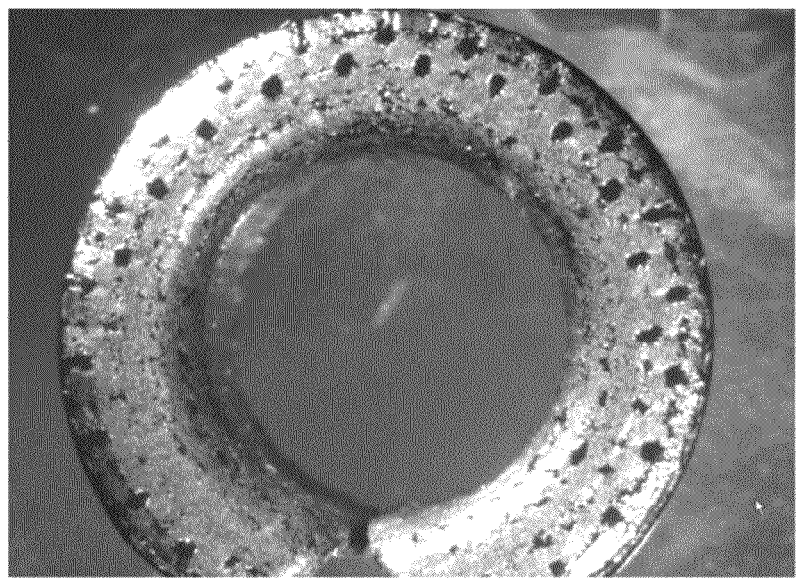
FIG. 9 is an alternate view of the corrosion resistant bushing.
Figure 10:
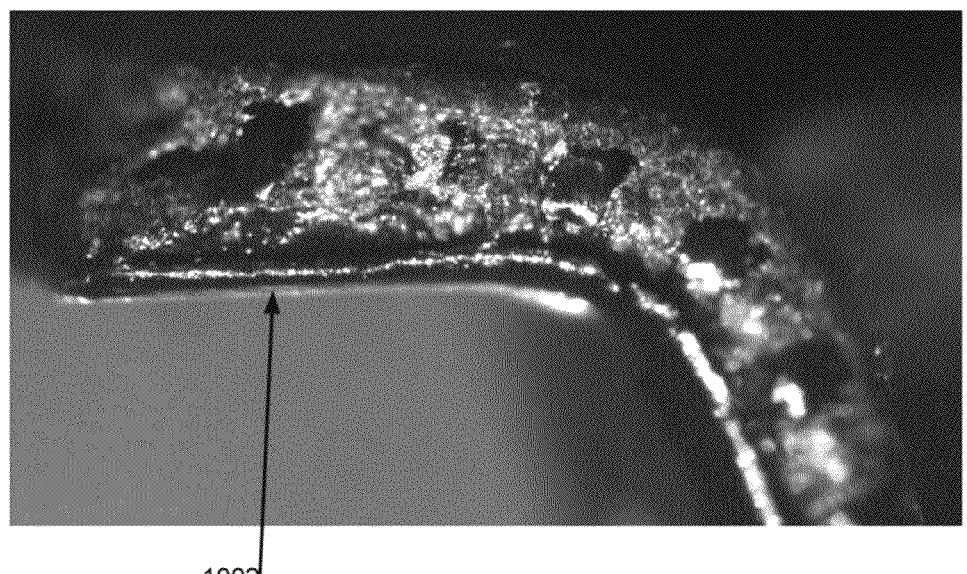
FIG. 10 is a close-up view of region 802 of FIG. 8 showing the cut edges of the corrosion resistant bushing.

Sample 2 is prepared as Comparative Sample 1 except an epoxy layer is applied to the semi-finished bushing rather than the passivated and sealed zinc layer. The epoxy layer is applied using an e-coating process. Sample 3 is prepared as Sample 1 except a zinc phosphate layer is applied to the semi-finished bushing as an adhesion promoter layer prior to the epoxy layer. Sample 4 is prepared as Sample 3 except a galvanic zinc layer is used as the adhesion promoter layer. Sample 5 is prepared as Sample 3 except a mechanical zinc layer is used as an adhesion promoter layer. The Corrosion Resistance Ratings of Samples 2, 3, 4, and 5 are determined to be at least 120 hours, at least 120 hours, at least 300 hours, and at least 250 hours, respectively. FIGS. 8 and 9 show the finished bushing of Sample 2. FIG. 10 is a close up view of the edge region 802 of FIG. 8. FIG. 10 shows the conformal coating of the epoxy on the load bearing substrate portion of the cut edge of the laminate, as indicate at 1002.

What is claimed is:

1. A bushing comprising:
   a load bearing substrate having a first major surface, a second major surface, and edges;
   a sliding layer bonded to the first surface, wherein the sliding layer includes a polymer, wherein the polymer is selected from the group consisting of polytetrafluoroethylene, fluorinated ethylene-propylene, polyvinylidenfluoride, polychlorotrifluoroethylene, ethylene chlorotrifluoroethylene, perfluoroalkoxypolymer, polyacetal, polybutylenterephtalate, polyimide, polyetherimide, polyetheretherketone, polyethylene, polysulfone, polyamid, polyphenylenoxide, polyphenylensulfide, polyurethane, polyester, and any combination thereof; and
   a corrosion resistant layer bonded to the second surface and extending to cover the edges of the load bearing substrate, wherein the corrosion resistant layer includes an epoxy resin, wherein the corrosion resistant coating further includes an adhesion promoter layer underlying the epoxy resin layer, the adhesion promoter selected from the group consisting of a zinc phosphate, an iron phosphate, a manganese phosphate, a tin phosphate, a silane, a chlorinated polyolefin, zinc, zinc-nickel, and any combination thereof.

2. The bushing of claim 1, wherein the bushing has a cylindrically shaped portion.

3. The bushing of claim 1, wherein the corrosion resistant coating has a thickness of between about 1 micron and about 50 microns.

4. The bushing of claim 1, wherein the epoxy resin layer includes a filler.

5. The bushing of claim 4, wherein the filler is a conductive filler, and the bushing is a conductive bushing.

6. The bushing of claim 1, wherein the epoxy resin layer has a cure temperature below a degradation temperature of an adhesive layer between the first major surface of the load bearing substrate and the sliding layer.

7. The bushing of claim 1, further comprising an adhesive layer between the first major surface of the load bearing substrate and the sliding layer.

8. The bushing of claim 7, wherein the adhesive layer includes a melt adhesive.

9. The bushing of claim 1,
   wherein the bushing has a Corrosion Resistance Rating of at least about 120 hours.

10. The bushing of claim 9, wherein the Corrosion Resistance Rating of at least about 168 hours.

11. The bushing of claim 10, wherein the Corrosion Resistance Rating of at least about 240 hours.

12. The bushing of claim 11, wherein the Corrosion Resistance Rating of at least about 288 hours.

13. The bushing of claim 9, wherein the load bearing substrate has edges not covered by the sliding layer and the corrosion resistant coating is a conformal coating that extends to cover the edges of the load bearing substrate.

14. The bushing of claim 1, wherein the load bearing substrate includes a metal or metal alloy.

15. A bushing preform comprising:
    a load bearing substrate having a first major surface, a second major surface, and edges;
    a sliding layer bonded to the first surface, wherein the sliding layer includes a polymer, wherein the polymer is selected from polytetrafluoroethylene, fluorinated ethylene-propylene, polyvinylidenfluoride, polychlorotrifluoroethylene, ethylene chlorotrifluoroethylene, perfluoroalkoxypolymer, polyacetal, polybutylenterephtalate, polyimide, polyetherimide, polyetheretherketone, polyethylene, polysulfone, polyamid, polyphenylenoxide, polyphenylensulfide, polyurethane, polyester, or any combination thereof; and
    a corrosion resistant layer bonded to the second surface and extending to cover the edges of the load bearing substrate, wherein the corrosion resistant layer includes an epoxy resin, wherein the corrosion resistant coating further includes an adhesion promoter layer underlying the epoxy resin layer, the adhesion promoter selected from the group consisting of a zinc phosphate, an iron phosphate, a manganese phosphate, a tin phosphate, a silane, a chlorinated polyolefin, zinc, zinc-nickel, and any combination thereof.

16. The bushing preform of claim 15, wherein the bushing preform is a laminate, a cut blank, or a semi-finished bushing.

* * * * *